United States Patent … US 8,447,913 B2
Kelley et al. … May 21, 2013

(54) METHOD TO MONITOR READ/WRITE STATUS OF FLASH MEMORY DEVICES

(75) Inventors: Edward E. Kelley, Wappinger Falls, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/211,424

(22) Filed: Sep. 16, 2008

(65) Prior Publication Data

US 2010/0070683 A1  Mar. 18, 2010

(51) Int. Cl.
G06F 12/00 (2006.01)

(52) U.S. Cl.
USPC ................................... 711/103; 711/E12.001

(58) Field of Classification Search
USPC .......................................... 711/103, E12.001
See application file for complete search history.

(56) References Cited

U.S. PATENT DOCUMENTS

| | | | |
|---|---|---|---|
| 5,896,398 A | 4/1999 | Sekine | |
| 6,000,006 A * | 12/1999 | Bruce et al. | 711/103 |
| 6,005,810 A | 12/1999 | Wu | |
| 6,400,634 B1 * | 6/2002 | Liou et al. | 365/230.03 |
| 6,665,214 B1 * | 12/2003 | Cheah et al. | 365/185.22 |
| 6,845,060 B2 | 1/2005 | Lee | |
| 2006/0282610 A1 * | 12/2006 | Dariel et al. | 711/103 |
| 2008/0313505 A1 * | 12/2008 | Lee et al. | 714/47 |
| 2008/0320207 A1 * | 12/2008 | Ma et al. | 711/103 |
| 2009/0031150 A1 * | 1/2009 | Koga | 713/300 |

* cited by examiner

Primary Examiner — Mardochee Chery
(74) Attorney, Agent, or Firm — Scully, Scott, Murphy & Presser, P.C.; Ronald Kaschak, Esq.

(57) ABSTRACT

A method and flash memory device employing the method includes a flash memory device having a logic routine saved on the flash memory being a computer readable medium. The flash memory device generates a plurality of memory inputs and outputs. The logic routine determines a memory input and/or memory output operation, and incrementally counts memory inputs and memory outputs using a counter function of the logic routine. The logic routine determines the total number of the plurality of memory inputs and outputs using the counter function. Additionally, the logic routine generates an alert signal when the total number of the memory inputs and outputs exceeds a predetermined value programmed in the logic routine.

7 Claims, 2 Drawing Sheets

METHOD TO MONITOR READ/WRITE STATUS OF FLASH MEMORY DEVICES

FIELD OF THE INVENTION

The present invention relates to non-volatile memory storage systems and a method for counting input/output operations such as read/write operations on the memory storage system, and more specifically, non-volatile memory storage systems and a method for counting read/write (or input/output) operations using the memory for indicating lifecycle of the memory.

BACKGROUND OF THE INVENTION

Currently, it is desirable to replace hard drives in computers and other pervasive computing devices with flash memory. Flash memory is a non-volatile computer memory that can be electrically erased and reprogrammed. It is also common to use an external flash memory device or flash memory universal serial bus (USB) compatible device for communicating with a computer using a USB port in the computer. The proliferation of flash memory is caused, inter alia, by the increased data storage capacity in flash memory, and the lack of moving parts susceptible to break down due to normal mechanical stress, as, for example, with typical hard drives.

However, a disadvantage of using flash memory devices is that the device has a limited number of input/output operations, e.g., read and write operations before the memory fails, that is, a known life cycle. Each time there is a read or write operation the flash memory degrades in an approximately linear fashion, i.e., the rate of memory capability is nearly directly proportional to the number of read and write operations performed against the flash memory device. The degradation is less of a problem when using flash memory in, for example, USB sticks, which are intended for temporary transfer of relatively small amounts of data. However, degradation of the flash memory becomes a larger problem when the flash memory devices are depended on for critical storage of larger amounts of data under higher levels of usage.

Known methods are directed towards the management of flash memory, such as, using different regions of the memory cell when reading and writing so as not to degrade the memory in just a few areas. Other methods test writing of data to the flash memory before writing the data. Other methods track the number of reads and writes to a flash memory drive and prevent activity or relocates data to specific cells after a predetermined number of activity is reached.

It would therefore be desirable to provide a method for ascertaining and indicating memory usage, and a threshold in a known life cycle of the memory device. It would also be desirable to present such data to a user.

SUMMARY OF THE INVENTION

A method for monitoring an electronic memory device includes: providing a flash memory device having a logic routine saved on flash memory being a computer readable medium, the flash memory device communicatable with a processor; operating the flash memory device generating a plurality of memory inputs and outputs using the processor; determining a memory input or memory output operation using the logic routine; incrementally counting a plurality of memory inputs and memory outputs using a counter function of the logic routine; determining a total number of the plurality of memory inputs and outputs using the counter function of the logic routine; and generating an alert signal using the logic routine when the total number of the memory inputs and outputs exceeds a predetermined value programmed in the logic routine.

In a related aspect, the predetermined value is a threshold number of memory inputs and outputs being an expected mean time to failure of the flash memory device. The logic routine may include a warning function programmable by a user for indicating a specified number of memory input and output operations in relation to the total number of the memory inputs and outputs. The warning function may include a plurality of warning signals each indicating a specified number of memory input and output operations in relation to the total number of the memory inputs and outputs. The method may further include the steps of: providing a computer system having a computer readable medium having a program stored thereon and the program being executable by the processor, and the logic routine communicating with the processor of the computer system; sending the alert signal to the processor using the logic routine; initiating a warning signal using the logic routine when the warning function indicates the predetermined number of memory input and output operations in relation to the total number of the memory inputs and outputs is reached; receiving the alert signal and the warning signal using the processor; and initiating a communications signal using the processor to a user for communicating the alert signal and the warning signal. The warning signal may indicate a life expectancy of the flash memory device. The input and output operations may include read and write operations. A user may selectively set a criteria using a computer system for a warning function of the logic routine for indicating a specified number of memory input and output operations in relation to the total number of the memory inputs and outputs. The user may selectively set different criteria for each of a plurality of warnings generated by the warning function of the logic routine.

In another aspect of the invention, a flash memory device includes a logic routine saved on flash memory as a computer readable medium. The flash memory is communicatable with a computer system having a computer readable medium having a program stored thereon and the program is executable by a processor. The flash memory is capable of generating a plurality of memory inputs and outputs. The logic routine determines memory input and memory output operations, and the logic routine incrementally counts memory inputs and memory outputs using a counter function of the logic routine. The logic routine determines the total number of the plurality of memory inputs and outputs using the counter function. The logic routine generates and sends an alert signal to the processor for initiating a warning signal when the total number of the memory inputs and outputs exceeds a predetermined value programmed in the logic routine.

In a related aspect, the predetermined value is a threshold number of memory inputs and outputs which is an expected mean time to failure of the flash memory device. The program may include a warning function programmable by a user for indicating a predetermined number of memory input and output operations in relation to the total number of the memory inputs and outputs. The warning function may include a plurality of warning signals each indicating a specified number of memory input and output operations in relation to the total number of the memory inputs and outputs. The input and output operations may include read and write operations. A user may selectively set a criteria using a computer system for a warning function of the logic routine for indicating a specified number of memory input and output operations in relation to the total number of the memory inputs and outputs. The user may selectively set different criteria for each of a plurality of warnings generated by the warning function of the logic routine.

In another aspect of the invention, a computer program product includes flash memory as a computer readable medium having recorded thereon a computer program for enabling a processor in a computer system for monitoring the status of memory input and output operations of the flash memory and communicating with the computer system. The flash memory operates to generate a plurality of memory inputs and outputs on the flash memory, and the program executes steps comprising: determining a memory input and memory output operation using the program; incrementally counting memory inputs and memory outputs using a counter function of the program; determining a total number of the plurality of memory inputs and outputs using the counter function of the program; and generating an alert signal using the program when the total number of the memory inputs and outputs exceeds a predetermined value programmed in the program.

In a related aspect, the computer program product further includes the steps of: initiating a warning signal using the logic routine when the warning function indicates the predetermined number of memory input and output operations in relation to the total number of the memory inputs and outputs is reached; receiving the alert signal and the warning signal using the processor; and initiating a communications signal using the processor to a user for communicating the alert signal and the warning signal.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
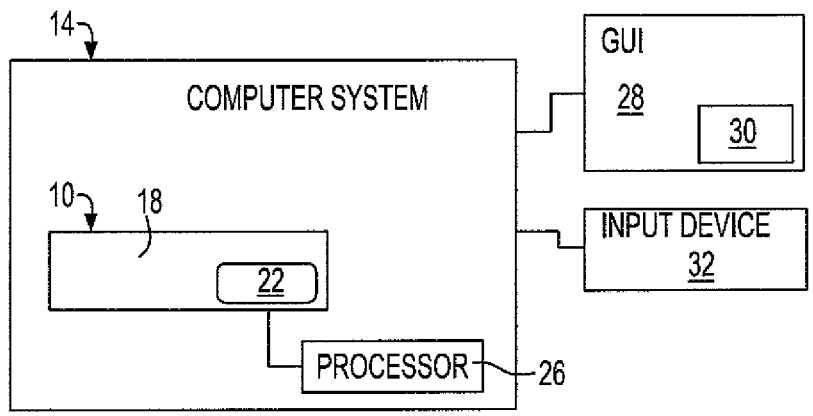
FIG. 1 is a block diagram of a flash drive in a computer system according to an embodiment of the invention.

Referring to FIG. 1, a flash memory device 10 according to an embodiment of the invention includes flash memory 18 as a computer readable storage medium. The flash memory device 10 is part of a computer system 14 having a processor 26. The flash memory device includes a logic routine or program 22 stored therein on the flash memory 18. The flash memory device 10 communicates with the computer system 14. The flash memory device may also be external to the computer system and communicating with the processor 26 via, for example, a universal serial bus (USB) connection. A graphical user interface (GUI) 28 and an input device 32, such as a keyboard and/or a mouse, are connected to the computer system 14 for interaction with a user for example, using a dialog box 30 on the GUI 28.

Figure 2:
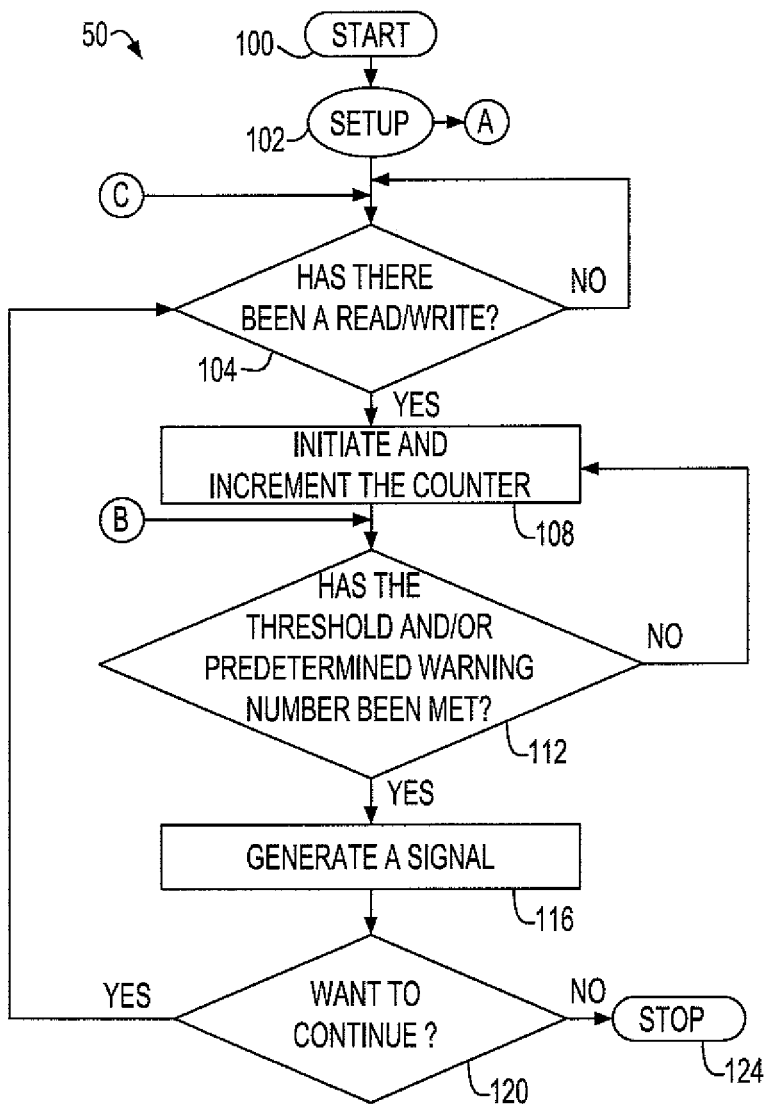
FIG. 2 is a flow chart of a method for monitoring read/write (input/output) operations of non-volatile memory according to the invention.

Referring to FIG. 2, a method 50 according to an embodiment of the invention monitors input and output operations or read/write operations to the flash memory 18. The method 50 includes a start operation step 100 initiating the logic routine or program 22 (FIG. 1) for monitoring the read/write operations in the flash memory 18. A setup step 102 is presented for initial use and for changing settings or options of the program 22 (FIG. 1), and will be discussed in detail later in this description. The method proceeds to determine if there has been a read/write operation in step 104. If there has been a read/write operation, then the method continues to step 108 wherein a counter is initiated to incrementally count read/write operations and total the number of read/write operations. If there has not been a read/write operation, the method continues to monitor for a read/write operation by looping back before step 104.

The method determines whether a threshold number of read/write operations is met in step 112. If the threshold number has not been met, the method returns to step 108 to continue counting. If the threshold number has been met, a signal is generated 116 for communication to a user that the threshold has been met, e.g., a warning signal. In one embodiment, the signal is read by the processor 26 which can generate an indication that the status of the counter, e.g., that the threshold number has been reached, by communicating a visual indicator or a message to a computer screen. Alternatively, the status of the counter may be communicated using a status icon on a computer screen, or a pop up message or a dialog box 30 on a computer screen such as a GUI 28. In another alternative, a visual indicator such as a light emitting diode (LED) on an external flash drive may be used to communicate the status of the counter to a user. A user can choose to continue the program in step 120 wherein the method loops to step 104 to determine if there has been a read/write operation. The user may also decide to exit the program 22 in step 120 wherein the program is stopped in step 124.

Figure 3:
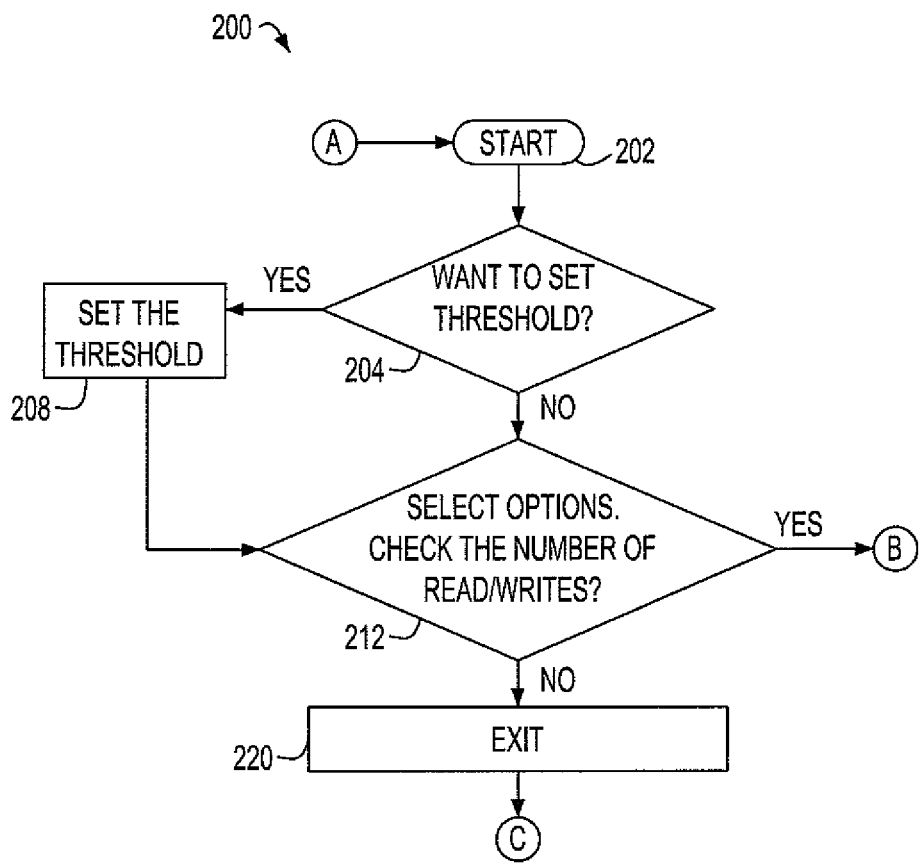
FIG. 3 is a subroutine for initiating the counting function of the method shown in FIG. 2.

Referring to FIG. 3, a subroutine 200 of the method 50 is started at step 202 when the setup option is chosen in step 102 of the method 50. Once the subroutine 200 is started at step 202, the user determines whether to set the threshold number for the total number of read/write operations in step 204. If the user wants to set the threshold number of read/write operations, in step 208 the user sets the threshold number, for example using a dialog box 30 on the GUI 28 using an input device 32, e.g., a keyboard. Typically, the threshold number is supplied by the manufacturer and represents the manufacturers expected amount of operations before failure, or a mean time before failure (MTBF) number defining the lifecycle or lifetime of the flash memory device. Alternatively, the threshold number may be set by a manufacturer prepackaged with the program installed on a flash memory device. In the present embodiment, the threshold number is set by default and the user can customize or modify the threshold number in step 204 of subroutine 200.

Once the user has set the threshold number of read/write operations, the user can decide in step 212 whether to check the number of read/write operations that have occurred. Further in step 212, the user can select from a multiplicity of options for providing alert signals that the threshold number has been reached or is nearing when the total number of read/write operations are counted. One type of alert signal includes a warning signal initiated after a predetermined number of read/write operations have been reach. The warning signal may be sent to a monitor or graphical user interface (GUI) 28 indicting to the user that the threshold number of read/write operations is approaching using a pop up window or dialog box 30 (FIG. 1). The predetermined number of read/write operations may be a percentage of the threshold number, or several warnings may be selected, such as, ninety percent and again at ninety seven percent of the threshold number. The percentage of the threshold number or expected operations, may be a percentage of the MTBF number. In another option, the alert signal may be initiated when the threshold number is reach, and one or more warning signal may be initiated at predetermined numbers of read/write operations with respect to the threshold number. Thus, the user can selectably choose or set the above warning options/criteria and predetermine warning criteria such as when the warning is initiated by the number of read/write operation or a percentage of read/write operations with respect to the threshold number. As described above, the user can interact using an input device 32 and a dialog box 30 on a GUI 28 to select warning options, and input warning criteria.

If the user chooses to check for the number of read write operation after setting the threshold number and selecting options, the subroutine proceeds to step 112 of method 50. The signal in step 116 initiates a display, e.g., the GUI 28, of the number or a percentage of the total number of read/write operations in relation to the threshold number, or alternatively, an indication representing that the threshold number has been reach, or is being approached, or a graphical display of the percentage of read/write operations in relation to the threshold number. If the user decides to not check the number of read/write operations in step 212 of subroutine 200, the subroutine exits at step 220 to step 104 of the method 50 and proceeds to monitor the flash memory for read/write operations.

One advantage of the method 50 according to the present invention is that the user may better plan for flash memory replacements, and/or move data from a flash drive before failure of the flash memory drive. A further advantage of the invention is in providing feedback to the user for the total number of read/write operations used in the lifetime of the slash memory device 10. Another advantage of the present invention is the user is able to customize the warning signal(s) at different points in the flash memory device's life cycle.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for monitoring an electronic memory device, comprising:
   providing a flash memory device having a logic routine saved on flash memory being a non-transitory computer readable medium, the flash memory device communicatable with a processor;
   operating the flash memory device generating a plurality of memory inputs and outputs using the processor;
   determining a memory input or memory output operation using the logic routine;
   incrementally counting a plurality of memory inputs and memory outputs using a counter function of the logic routine;
   determining a total number of the plurality of memory inputs and outputs using the counter function of the logic routine;
   generating an alert signal using the logic routine when the total number of the memory inputs and outputs exceeds a predetermined value programmed in the logic routine, wherein the predetermined value is based on a threshold number of memory inputs and outputs, the threshold number being based on an expected mean time to failure of the flash memory device;
   wherein the logic routine includes a warning function programmable by a user for indicating a specified number of memory input and output operations in relation to the total number of the memory inputs and outputs;
   wherein the warning function generates a plurality of warning signals each indicating a specified number of memory input and output operations in relation to the total number of the memory inputs and outputs;
   providing a computer system having a non-transitory computer readable medium having a program stored thereon and the program being executable by the processor, and the logic routine communicating with the processor of the computer system;
   sending the alert signal to the processor using the logic routine;
   sending a plurality of warning signals to the processor using the logic routine when the warning function indicates each of a predetermined number of memory input and output operations in relation to the total number of the memory inputs and outputs is reached;
   receiving the alert signal and the warning signals using the processor;
   sending a first communications signal using the processor to the user, wherein the first communications signal comprises the alert signal;
   sending a plurality of second communications signals using the processor to the user, wherein each of the second communications signals comprises one of the warning signals;
   the user selectively setting a criteria using a user interface of the computer system for the warning function of the logic routine for indicating a specified number of memory input and output operations in relation to the total number of the memory inputs and outputs, wherein the user interface includes a GUI (Graphical User Interface) and an input device;
   the user selectively setting different criteria using the user interface for each of the plurality of warning signals generated by the warning function of the logic routine; and
   the user selecting the threshold number from a dialog box displayed on the GUI using the input device;
   wherein an indication of the first communications signal is shown to the user visually; and
   wherein an indication of each of the second communications signals is shown to the user visually.

2. The method of claim 1, wherein the warning signal indicates a life expectancy of the flash memory device.

3. The method of claim 1, wherein the input and output operations include read and write operations.

4. A flash memory device, comprising:
   a logic routine saved on flash memory being a non-transitory computer readable medium, the flash memory communicatable with a computer system having a non-transitory computer readable medium having a program stored thereon and the program being executable by a processor, the flash memory capable of generating a plurality of memory inputs and outputs;
   the logic routine determining memory input and memory output operations, and the logic routine incrementally counting memory inputs and memory outputs using a counter function of the logic routine, the logic routine determining the total number of the plurality of memory inputs and outputs using the counter function, and the logic routine generating and sending an alert signal to the processor for initiating an alert when the total number of the memory inputs and outputs exceeds a predetermined value programmed in the logic routine, wherein the predetermined value is based on a threshold number of memory inputs and outputs, the threshold number being based on an expected mean time to failure of the flash memory device;

wherein the program includes a warning function programmable by a user for indicating a predetermined number of memory input and output operations in relation to the total number of the memory inputs and outputs;

wherein the warning function generating a plurality of warning signals each indicating a specified number of memory input and output operations in relation to the total number of the memory inputs and outputs;

wherein a user selectively sets a criteria using a user interface of a computer system for the warning function of the logic routine for indicating a specified number of memory input and output operations in relation to the total number of the memory inputs and outputs, wherein the user interface includes a GUI (Graphical User Interface) and an input device;

wherein the user selectively sets different criteria using the user interface for each of the plurality of the warnings signals generated by the warning function of the logic routine; and the user selecting the threshold number from a dialog box displayed on the GUI using the input device;

wherein a first communications signal is sent to the user using the processor, wherein the first communications signal comprises the alert signal;

wherein a plurality of second communications signals are sent to the user using the processor, wherein each of the second communications signals comprises one of the warning signals;

wherein an indication of the first communications signal is shown to the user visually; and wherein an indication of each of the second communications signals is shown to the user visually.

5. The device of claim 4, wherein the input and output operations include read and write operations.

6. A computer program product comprising flash memory as a non-transitory computer readable medium having recorded thereon a computer program for enabling a processor in a computer system for monitoring the status of memory input and output operations of the flash memory and communicating with the computer system, the flash memory operating to generate a plurality of memory inputs and outputs on the flash memory, the program executing steps comprising:

determining a memory input and memory output operation using the program;

incrementally counting memory inputs and memory outputs using a counter function of the program;

determining a total number of the plurality of memory inputs and outputs using the counter function of the program;

generating an alert signal using the program when the total number of the memory inputs and outputs exceeds a predetermined value programmed in the program, wherein the predetermined value is based on a threshold number of memory inputs and outputs, the threshold number being based on an expected mean time to failure of the flash memory device;

wherein the program includes a warning function programmable by a user for indicating a specified number of memory input and output operations in relation to the total number of the memory inputs and outputs;

wherein the warning function generates a plurality of warning signals each indicating a specified number of memory input and output operations in relation to the total number of the memory inputs and outputs;

sending the alert signal to the processor using the program;

sending a plurality of warning signals to the processor using the program when the warning function indicates each of a predetermined number of memory input and output operations in relation to the total number of the memory inputs and outputs is reached;

receiving the alert signal and the warning signals using the processor;

sending a first communications signal using the processor to the user for communicating the alert signal;

sending a plurality of second communications signals using the processor to the user, wherein each of the second communications signals comprises one of the warning signals;

the user selectively setting a criteria using a user interface of the computer system for the warning function of the logic routine for indicating a specified number of memory input and output operations in relation to the total number of the memory inputs and outputs by the user, wherein the user interface includes a GUI (Graphical User Interface) and an input device;

the user selectively setting different criteria using the user interface for each of the plurality of the warning signals generated by the warning function of the program; and the user selecting the threshold number from a dialog box displayed on the GUI using the input device;

wherein an indication of the first communications signal is shown to the user visually; and wherein an indication of each of the second communications signals is shown to the user visually.

7. The method of claim 6, wherein the threshold number is initially set by default, and the user sets the threshold number by modifying the threshold number initially set by default.

* * * * *